United States Patent [19]
von Bose et al.

[11] 3,933,111
[45] Jan. 20, 1976

[54] DOCK BUMPER UNIT

[75] Inventors: Robert J. von Bose, Arlington; Darrell D. Dial, Fort Worth, both of Tex.

[73] Assignee: Oil States Rubber Company, Arlington, Tex.

[22] Filed: Mar. 22, 1974

[21] Appl. No.: 453,853

[52] U.S. Cl. .................................. 114/219; 61/48
[51] Int. Cl.² .................................... B63B 59/02
[58] Field of Search .......... 114/219, 230; 61/49, 48; 267/139, 140; 293/70, 72, 85, 89

[56] References Cited
UNITED STATES PATENTS

| | | | |
|---|---|---|---|
| 3,235,244 | 2/1966 | Hein | 114/219 |
| 3,406,523 | 10/1968 | Baker et al. | 114/219 |
| 3,459,004 | 8/1969 | Morini | 114/219 |
| 3,700,273 | 10/1972 | Jackson et al. | 267/139 |
| 3,788,260 | 2/1974 | Morini | 114/219 |
| 3,809,420 | 5/1974 | Weller | 293/70 |

Primary Examiner—Trygve M. Blix
Assistant Examiner—Stuart M. Goldstein
Attorney, Agent, or Firm—John H. Tregoning

[57] ABSTRACT

A method and apparatus is provided for dissipating the energy of random dynamic forces exerted against a pier. The dynamic forces are received by a bumper connected to the side of a pier. The normal components of the forces exerted against the bumper are cushioned and the energy of these forces dissipated by means of reactive forces developed incident to compression of a plurality of compressible, self-restoring cushions connecting and extending orthogonally between the bumper and the pier. Lateral displacement of the bumper relative to the pier in response to components of the dynamic forces acting parallel to the bumper is rigidly restrained by restraining members connecting the bumper and the pier. Once the normal components of the dynamic forces are dissipated, the cushions restore themselves to uncompressed, fully extended conditions and the fender is prepared to receive subsequent loads.

12 Claims, 7 Drawing Figures

DOCK BUMPER UNIT

GENERAL BACKGROUND AND SUMMARY OF THE INVENTION

The present invention relates generally to a method and apparatus for protecting a pier. More particularly, the invention relates to a self-supporting docking fender which hydraulically dissipates the energy of forces applied thereto and which is positively restrained both laterally and axially.

The sudden increase in the degree of industrialization and affluence through much of the world has resulted in burgeoning international trade. Great quantities of goods are being routinely transported over enormous distances. A portion of these goods, particularly perishable materials, are transported by air. A considerably larger proportion of the goods are transported by land. However, the major and most economical mode of transporting materials in world trade is by water. Thus, great quantities of both raw and finished materials are transported by ship and most commonly by large ocean going vessels.

As ocean going trade has become more voluminous, the fixed unit construction and operating costs of the cargo vessels have produced a trend toward large ships. Accordingly, facilities capable of handling smaller vessels suddenly have become inadequate for handling the hugh vessels seeking to come to port. For instance, many natural harbors which serve as distribution centers to inland industrial areas are simply too shallow to accommodate the deep draft of many modern heavily loaded ships. This is particularly true of those vessels referred to as supertankers which carry petroleum and liquified natural gas in international trade. In the case of these supertankers, the problem of insufficiently deep natural harbors is circumvented by constructing large offshore terminals where the water is sufficiently deep to accommodate the ship. Oil or liquified natural gas can be pumped to or from the terminal and loaded or unloaded aboard the ship.

When an offshore terminal is used, the super tankers are commonly moored during loading and unloading to mooring dolphins. These mooring dolphins consist essentially of large, slender towers extending from the floor of the body of water upwardly to protrude a desired distance above the water. In addition to being moored to the mooring dolphin, the tanker is normally berthed along side a number of breasting dolphins or similar pier structures. It should be apparent that during berthing a ship the size of a super tanker can impact and severely damage the breasting dolphins or pier. Likewise, once berthed, the motion of waves can cause the ship to impact or at least cyclically bear against the breasting dolphins or pier in a manner likely to cause considerable damage. In order to minimize damage which might occur incident to the exertion of dynamic forces due to impacts or wave motion as described above, it may be advantageous to provide docking fenders to dissipate the energy of the cyclic forces and thereby protect the breasting dolphins or pier and the hull of a ship.

It will be appreciated that similar problems occur in connection with more conventional facilities provided within a natural harbor. In this case, a ship is commonly berthed adjacent a wharf or other pier structure extending from the land out into the harbor. Just as in the case of offshore terminals, a ship may impact the wharf or pier during berthing. The problem of wave action, however, may be somewhat less severe since the harbor may be substantially more sheltered from the open sea and therefore less likely to receive the effects of significant wave action. Nonetheless, there exists an additional source of damage due to rising and falling tides. It should be readily appreciated that in the time required to load and unload a ship, the tides may raise and lower the ship several times and cause undesirable contact between the ship and the pier resulting in damage to the pier. As in the case of offshore terminals, damage of the sort which may be caused by dynamic forces exerted by a ship may be significantly reduced by the use of docking fenders to protect the wharf or pier.

Docking fenders of various types have been employed in attempts to alleviate problems of the type mentioned in the preceding. For various reasons these docking fenders have not been entirely successful and have presented a number of problems. For instance, a considerable number of the docking fenders presently in use employ simple, elastomeric bumpers or springs or other resilient elements to dissipate the energy of forces exerted against the fenders. While fenders of this type may be effective under some circumstances, they may not dissipate sufficient amounts of energy to satisfactorily accommodate very large vessels such as the super tankers mentioned in the preceding.

To increase the quantum of energy which can be dissipated, some docking fenders of the prior art may employ hydraulic cushions or dampers between the pier and a bumper intended to be contacted by the ship. While these devices may be more effective in dissipating energy, many such arrangements fail to provide a docking fender in which the bumper initially contacted by the ship is entirely free to translate and compress the hydraulic cushions or dampers. For instance, a bumper which is contacted by the hull of a ship may in some cases be pivoted along one edge and hydraulically cushioned by dampers disposed along the opposed edge. The energy dissipating qualities may thus be limited by the restricted movement of the bumper.

In other cases, while the bumper may be entirely free to move in response to forces exerted by the ship, the bumper may be supported and cushioned only by splayed, hydraulic cushions which interconnect the bumper and the pier. As a result, each cushion experiences less compression as the bumper is displaced toward the pier than if the cushions were orthogonally oriented between the bumper and the pier. Furthermore, in an arrangement in which the bumper is supported and cushioned by splayed cushions, the fender may be more vulnerable to the effects of glancing impacts or forces applied parallel to the surface of the bumper. Such impacts or forces may tend to displace the bumper laterally and thereby render the cushioning effect less effective. Additionally, lateral displacement of the bumper relative to the pier may cause damage to one or more of the cushioning units or to the connections between the cushions and the bumper or pier. Also, without a secondary supporting structure the splayed cushions may not provide sufficient vertical support to prevent vertical sagging of the bumper. Thus, it can be appreciated from the preceding that many docking fenders of the prior art which employ hydraulic cushioning units to dissipate the energy of forces applied to the fender may suffer the disadvantage that the bumper which receives the forces is not adequately restrained laterally against the effects of gravity and/or forces applied parallel to the surface of the bumper.

Somewhat related to the problem of restraining lateral displacement of the bumper relative to the pier is the problem of limiting displacement of the bumper axially away from the pier. Many fenders of the prior employing hydraulic cushions may make no provision for any positive limitation to the degree of spatial separation between the bumper and the pier. This lack of positive restraint may permit the cushions to be damaged should they be forced into a hyperextended or overtraveled condition. Similarly, many docking fenders of the prior art which employ hydraulic cushions to dissipate the energy of forces applied to the fender may provide no effective limitation to the degree of compression of the hydraulic cushions. If the fender is subjected to impacts which fully compress the cushions, then further impacts can not be cushioned. In other words, once the cushions are fully compressed, the fender becomes essentially a rigid structure incapable of absorbing and dissipating the energy of further applied forces. In this fully compressed, essentially rigid condition, the fender itself is as vulnerable to damage as would be an unprotected dock or pier.

In many offshore terminals and conventional harbor facilities alike, the space available for a docking fender may be somewhat limited. Thus, it can be appreciated that docking fenders which require large supportive or restraining structures may not be entirely suitable. In particular, if the elements which cushion, restrain, or otherwise connect the bumper and pier, extend from between the bumper and pier, undue amounts of space may be occupied. Even if space is not limited, elements extending from between the bumper and pier may be vulnerable to damage from impacts which may be received from the ship or equipment associated with the pier.

The problems enumerated in the preceding are among many which tend to reduce the effectiveness of previously known docking fenders. Other noteworthy problems may also exist, however, those presented in the discussion above should be sufficient to demonstrate that the docking fenders appearing in the art have not been altogether satisfactory. A docking fender according to the present invention is intended to at least obviate or minimize problems such as those mentioned above.

A docking fender according to the present invention receives dynamic forces exerted by the hull of a vessel through a generally planar, vertically oriented bumper which is connected in spaced relation to a side of a pier which is similarly generally planar and vertically oriented. As the dynamic forces are received, the bumper is displaced axially towards the pier in response to the components of the dynamic forces acting normally against the bumper. The energy of these normal components is dissipated by axially telescoping, hydraulic cushioning units orthogonally disposed between and connecting the bumper and the pier. The cushioning units dissipate the energy of these normal components by developing internal reactive forces which tend to resist axial compression of the cushions. Once the energy of the normal components of the dynamic forces is dissipated, the hydraulic cushions automatically restore themselves and return the bumper to a fully extended condition.

Lateral displacement of the bumper relative to the pier in response to components of the dynamic forces exerted parallel to the bumper is rigidly restrained at all times. This restraint is exerted by vertically inclined counters which exert generally lateral tensile forces between the bumper and the pier. The counters diagonally connect the bumper and the pier at points adjacent the corners within the perimeter of the bumper.

Hyperextension or overtravel of the cushions due to excessive axial displacement of the bumper away from the pier is prevented by means of axial counters which connect the bumper and the pier to positively restrain the bumper. This axial restraint prevents displacement of the bumper axially away from the pier beyond a prescribed distance at which the cushioning units are fully extended. At least one axial counter is disposed adjacent each of the cushioning units and all of the counters are disposed within the perimeter of the bumper.

Hypercompression or compressive overtravel of the cushioning units is prevented by means of a plurality of abutting members rigidly cantilevered from the pier. The free ends of the abutting members are coplanar and resilient and abut the inside surface of the bumper to prevent undue displacement of the bumper axially toward the pier. The positive limitation of displacement of the bumper axially toward the pier precludes excessive compression of the cushioning units.

In presenting the invention reference will now be made to a preferred embodiment. This preferred embodiment is by way of example and not by way of restriction or limitation with respect to the present invention and the manner in which it may be practiced.

THE DRAWINGS

A presently preferred embodiment of the invention is illustrated in the appended drawings in which.

Figure 3:
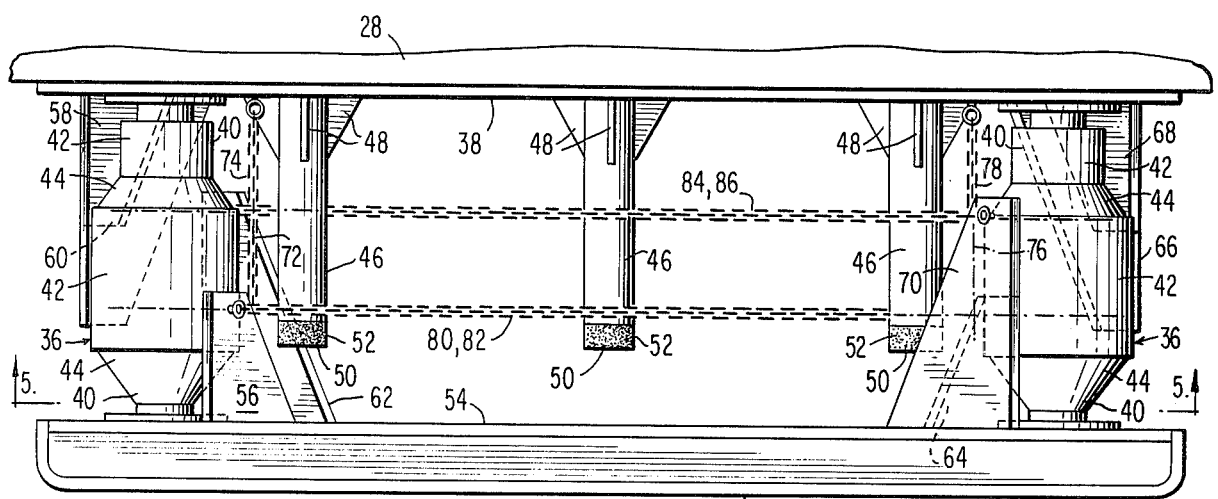
FIG. 3 illustrates a top view of a preferred embodiment of a docking fender according to the present invention free from the influence of any compressive forces.
Figure 5:
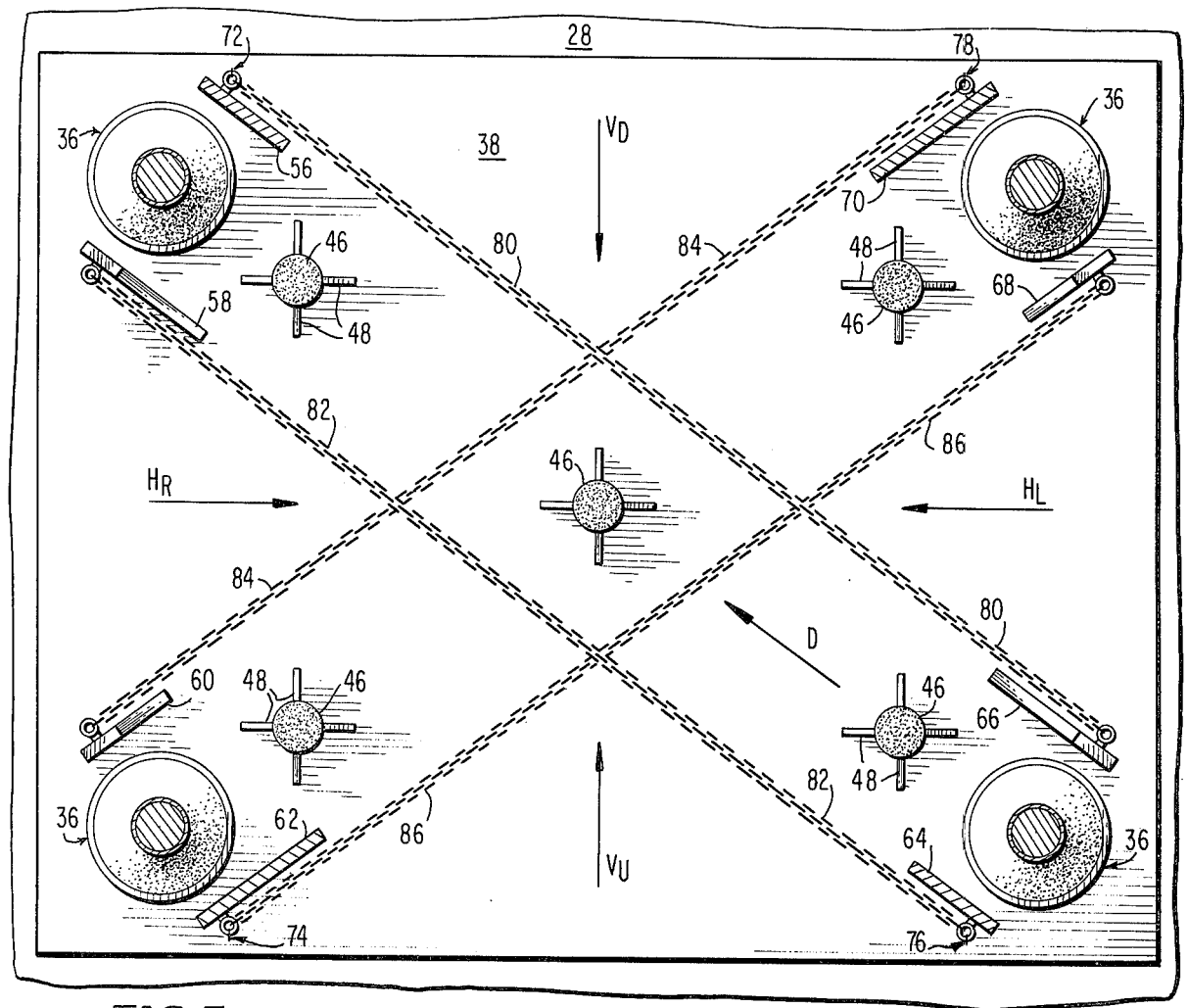
Figure 6:
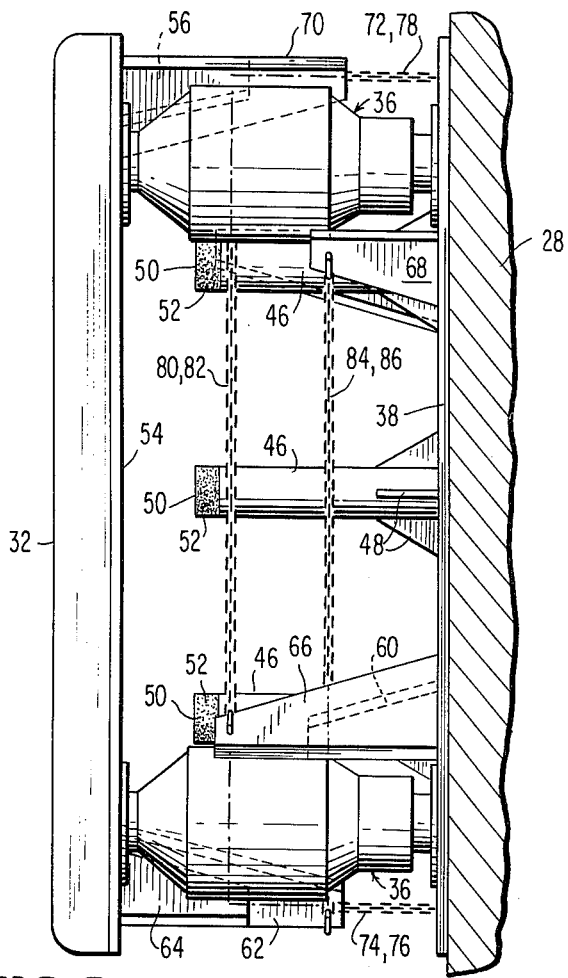
Figure 7:
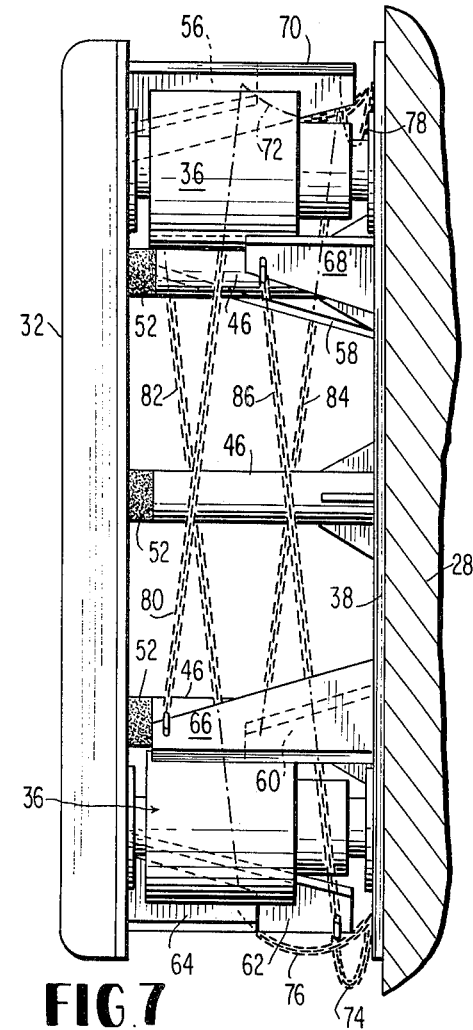
Figure 4:
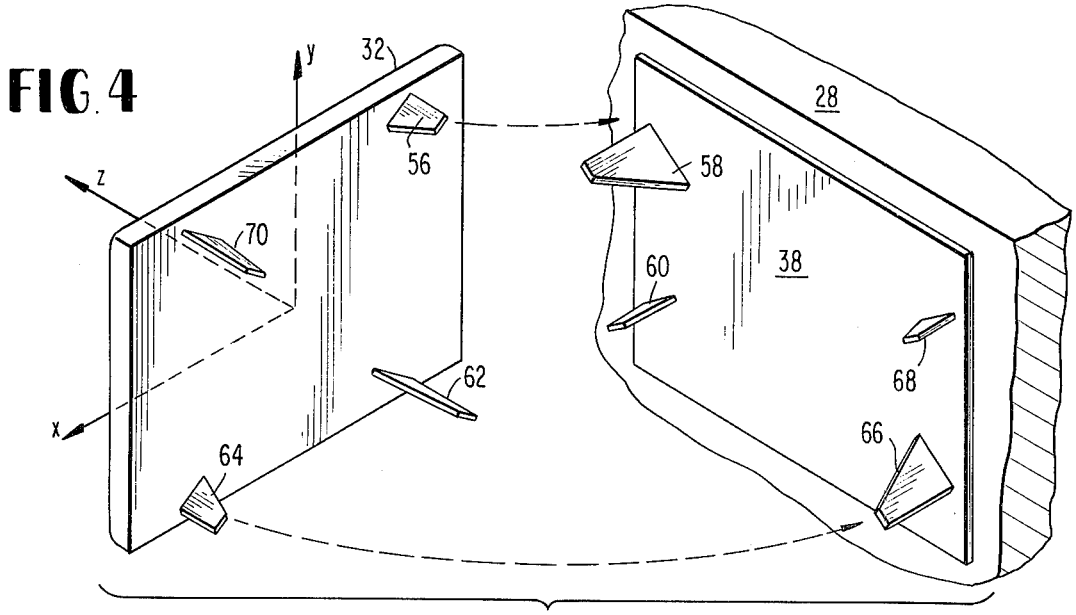

FIG. 4, note sheet 3, illustrates an expanded perspective view of a bumper and base plate with associated stanchions in which the cushioning and restraining elements have been removed for clarity of illustration;

FIG. 5, note sheet 2, illustrates a sectional view taken along section lines 5—5 of FIG. 3;

FIG. 6, note sheet 3, illustrates a side view of a preferred embodiment of a docking fender according to the present invention free from the influence of any compressive forces;

FIG. 7 illustrates a side view of a preferred embodiment of a docking fender with the cushioning elements fully compressed.

DETAILED DESCRIPTION

Context of the Invention

Figure 1:
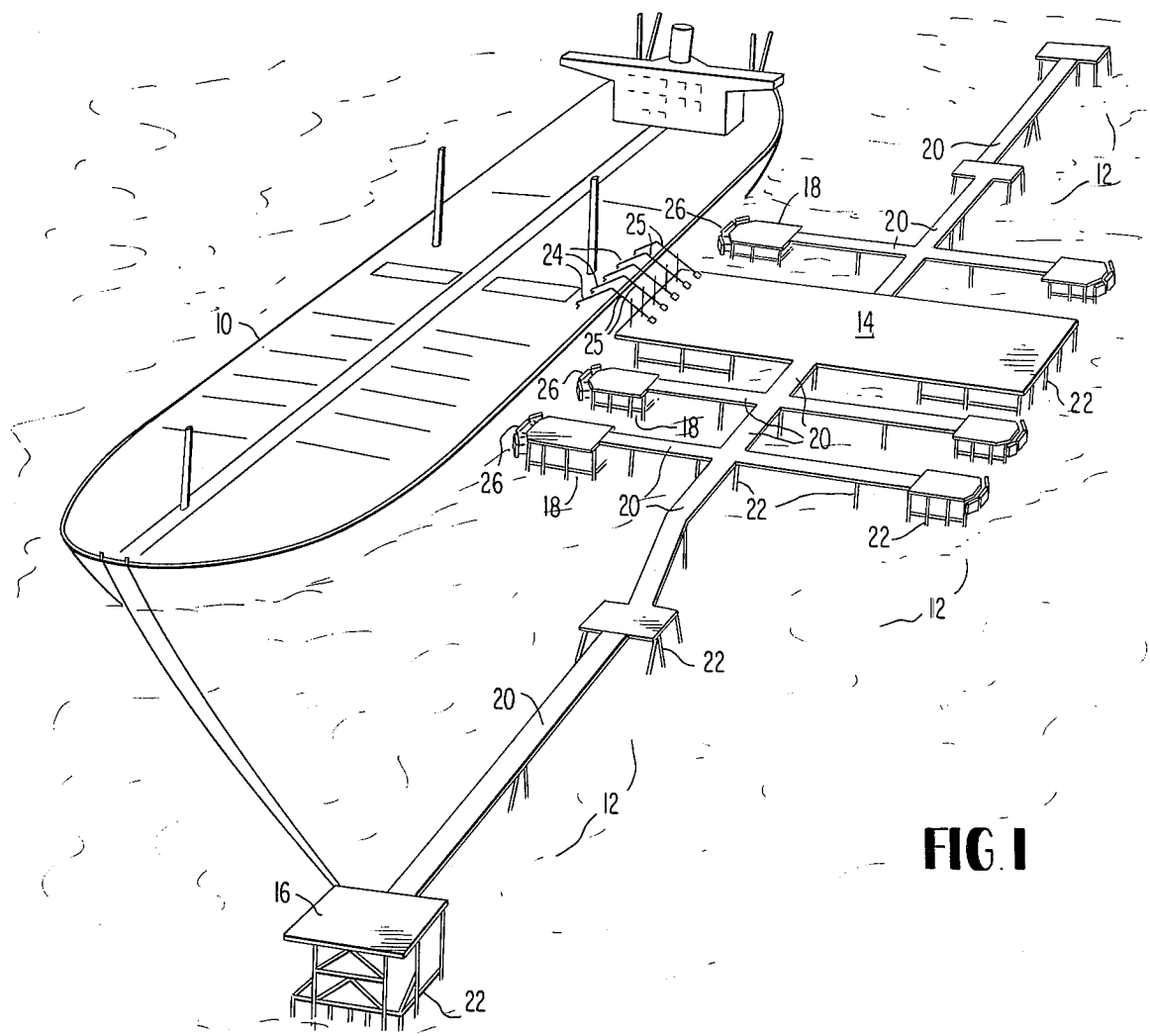
FIG. 1 illustrates a perspective view of a large floating vessel moored along side an offshore terminal which includes a plurality of breasting dolphins each protected by a plurality of docking fenders.

Referring now to FIG. 1, a perspective view can be seen of a large floating vessel 10 moored along side an offshore terminal 12. The ship is of the type employed to transport crude oil and is of a size commonly referred to as a supertanker. The ship is shown berthed adjacent the offshore terminal in a position suitable for loading or unloading oil.

The offshore terminal is located in water of sufficient depth to accommodate the draft of the tanker 10 and is comprised of a loading platform 14, a mooring dolphin 16, and a plurality of breasting dolphins 18. The loading platform 14, mooring dolphin 16, and breasting dolphins 18 are all interconnected by personnel bridges 20 extending between each structure. The entire terminal is supported by numerous free standing pilings 22 which extend from the floor of the body of water upward to an elevated position above the surface of the water sufficient to maintain the loading platform, dolphins, and personnel bridges a desired distance above the average height of waves expected in the area.

The loading platform serves to support a complex of conduits and machinery which facilitates the loading (or unloading) of petroleum aboard the ship. Oil is conducted to or from the terminal by means of converging large diameter submerged pipelines in communication with one or more tank farms onshore some distance away. During a loading operation oil supplied from the tank farm passes through the complex supported by the loading platform and ultimately through a plurality of loading conduits 24 supported by pendular loading arms 25 arranged along the edge of the platform adjacent the ship.

Due to the location of the terminal in an offshore environment, exposed to fairly open sea, and due to the proximity of the ship to the loading platform and breasting dolphins, the platform and dolphins could be quite vulnerable to damage from dynamic forces which may be exerted by the ship.

Generally, two types of dynamic forces can be exerted by the ship against the pier structure of the dolphins. Dynamic forces of contact may be exerted by the ship as it is being berthed adjacent the dolphins, and dynamic forces may be exerted through the ship once the vessel is berthed by waves acting upon the hull.

It will be appreciated that as the ship is being berthed it must be positioned in both a longitudinal and transverse sense relative to the pier formed by the dolphins. In many cases, a supertanker of the type illustrated can be as much as 300 yards long and can thus pose very difficult problems in properly positioning the ship. Errors can be very easily made in positioning a ship and these errors very often may be magnified by the enormous dimensions of the vessel. In any case, the necessary close proximity of the ship to the breasting dolphins makes it highly likely that the ship will at some time contact these dolphins. In this connection, it should be understood that a moving vessel of such great mass possesses enormous momentum even if moving only very slowly. It will be readily appreciated that considerable potential exists for the ship to severely damage the dolphins and/or loading platform.

Once the ship is berthed and moored, damage can be inflicted by the vessel due to wave action. It will be recalled from the preceding that an offshore terminal may often be located in relatively open sea. The terminal may, therefore, be exposed to considerable wave action. As the waves rise and fall the ship will tend to roll in a similar manner. Furthermore, the passage of waves may tend to translate the ship broadside or may induce a rocking motion in the ship which can result in dynamic loading of the dolphins by the ship. Therefore, the potential for damage due to wave action as reflected by corresponding motion of the ship should be readily apparent.

To minimize or eliminate damage of the type described in the preceding, docking fenders such as those illustrated at 26 have been interposed between the ship and the pier to receive and dissipate energy of dynamic forces which would otherwise be exerted by the ship directly against the dolphins or pier. A number of different types of docking fenders have been employed.

It should be appreciated that the usefulness of a docking fender in minimizing damage to a pier is not limited to the environment of offshore terminals. As indicated, conventional facilities located in natural harbors are also vulnerable to damage from dynamic forces exerted by large vessels. Though there are differences, the forces exerted by a ship against a pier located in a natural harbor are generally similar to those exerted against the pier of an offshore terminal. Ships, of course, must be berthed adjacent a pier in a natural harbor in much the same way as they are berthed adjacent an offshore terminal. Thus, a pier located in a natural harbor may generally be subjected to forces quite similar to those exerted during berthing by a ship at an offshore terminal.

Because natural harbors are often significantly more sheltered than offshore terminals, a ship moored within a natural harbor may undergo less motion due to wave action. If the ship is less subject to motion due to wave action, the pier will be less vulnerable to damage from forces originating from this source. In any case, a phenomenon less pronounced in an offshore environment produces effects analogous to those of wave action. More particularly, natural harbors may be exposed to pronounced rising and falling tides. The loading and unloading of a large vessel may occupy a considerable amount of time and during this period of time, the tides may cyclically rise and fall several times raising and lowering the ship as a result. Additionally, as the tide goes out and returns the ship may be drawn away and then forced against the pier. It will be appreciated that motion of this type, i.e., rising and falling of the ship and movement of the ship away from and against the pier, may cause damage analogous to that caused by wave action in an offshore environment.

General Structure and Operation of the Invention

Figure 2:
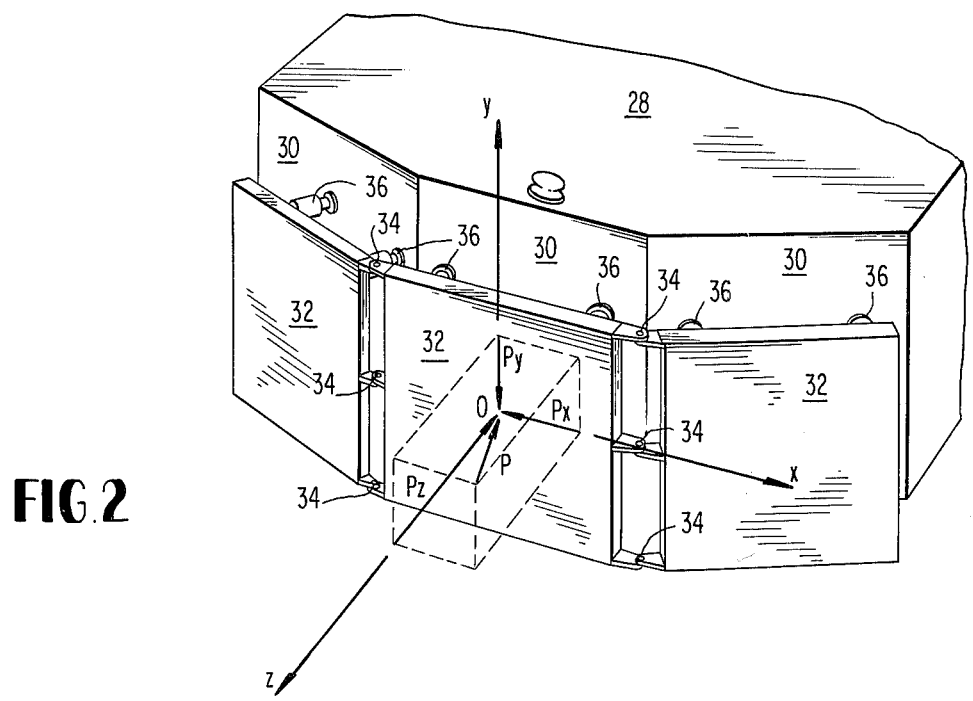
FIG. 2 illustrates a segmental, perspective view of a breasting dolphin protected by an assembly of docking fenders.

Referring now to FIG. 2, a segmental, perspective view of a breasting dolphin or other pier structure can be seen as protected by an a assembly of docking fenders according to the present invention. The pier 28 can be either a breasting dolphin of the type illustrated in FIG. 1 or a wharf of the type which might be located in a natural harbor. The pier 28 illustrated is polygonal and has several generally planar, vertical side surfaces 30 which face a body of water.

The assembly of docking fenders is comprised of multiple bumpers or bumper means 32 which are of a rectangular and generally planar configuration. The bumpers are arranged in a parallel, spaced relation with corresponding side surfaces 30 of the pier 28. The bumpers are pivotally connected to one another at hinges 34. The hinged relation of the bumpers provides continuous "wrap around" protection to the pier and allows the docking fenders to interact to dissipate the energy of forces applied to one or more of the bumpers 32.

The energy of dynamic forces exerted against one or more of the bumpers 32 is dissipated as the dynamic forces displace the bumpers toward the pier. The dissipation of the energy is effected by cushioning means such as the hydraulic cushions 36 which connect the bumpers to the pier. As will be more fully described in connection with the discussion of FIG. 3 to follow, the cushions 36 are orthogonally oriented relative to each bumper 32 and corresponding side surface 30. The cushions 36 are telescoping and self-restoring. The self-restoring character of the cushions enables the cushions to restore the bumpers to a fully extended posture relative to the pier 28 once the forces tending to push the bumper toward the pier are removed or fully dissipated.

The dynamic forces applied by the ship to a docking fender are almost entirely and random and may vary in both magnitude and direction. For example, a ship may exert a force such as that represented by the vector P against the bumper of a docking fender. The force vector P is shown in FIG. 2 in relation to a set of coordinate axes X, Y, and Z superimposed on one of the docking fenders. By means of three dimensional trigonometric analysis, the force vector P can be resolved into three orthogonal components coinciding in direction to the coordinate axes. These orthogonal components are identified as $P_x$, $P_y$, and $P_z$ as shown.

The coordinate axes are superimposed on the bumper 32 in a manner such that the XY plane coincides with the plane of the bumper. Therefore the components $P_x$ and $P_y$ of the vector P act parallel or tangent to the plane of the bumper 32. The remaining component $P_z$ of the vector P acts normally or perpendicularly against the plane of the bumper. It will be recognized that the two components acting parallel to the plane of the bumper tend to displace the bumper laterally. Because these components depend principally upon the degree of frictional resistance between the ship and the bumper, they are usually of relatively small magnitude and generally to not tend to damage the pier. However, it these components of the vector P are not restrained, the fender, and in particular, the cushions, could be damaged. The cushions might also be rendered less effective in dissipating of the energy of the component $P_z$ as it acts normally against the bumper to axially compress the cushions. Because of its direction and relatively great magnitude, the force represented by $P_z$ is the most destructive force applied against the pier. The cushions 36 prevent damage to the pier which might be caused by this component by dissipating the energy thereof as the bumper or bumpers are displaced axially toward the pier 28 along the Z axis of the coordinate system and the cushions 36 are accordingly compressed.

Detailed Structure and Operation of the Invention

Referring now to FIG. 3, a top view of a preferred embodiment of a docking fender according to the present invention can be seen in a condition free from the influence of any dynamic forces tending to displace the bumper toward the pier and compress the hydraulic cushions. Only a portion of the pier 28 to which the docking fender is connected is shown. However, it can be seen that the surface of the pier to which the docking fender is connected is vertical and essentially planar. A base plate 38 is employed to facilitate connection of the docking fender to the pier. The bumper 32 is a vertical, essentially planar member which is arranged in a parallel, spaced relation to the pier 28 and the base plate 38. A plurality of cushions 36 connect the bumper 32 and the base plate 38 and are arranged in an orthogonal posture therebetween. Any suitable cushion can be employed, however, cushions of the type which telescope upon compression and which are self-restoring are preferred. Hydraulic cushions of this type are particularly desirable.

The cushions 36 illustrated in FIG. 3 are each universally connected to both the bumper and the base plate by means of ball joints located generally in the ends 40 of the cushions. Rigid, annular tubes 42 of varying diameter surround the cushion itself and are interconnected by elastomeric, conical, truncated, annuli which seal and protect the cushion from the effects of the marine environment. The hydraulic cushion or damper within the rigid tubes and elastomeric annuli may be characterized by any of a number of different energy dissipating capacities.

Abutment means in the form of a plurality of rigidly cantilevered cylindrical abutment members 46 can be seen extending from the base plate 38. The abutment members 46 are braced relative to the base plate by means of a plurality of fillet members 48 which strengthen the connection between the base plate and the abutment members. The free ends 50 of the abutment members 46 are coplanar and each is composed of a pad 52 of resilient material. These abutment members provide a positive limit to the degree to which the cushions can be axially compressed. By limiting the axial compression of the cushions, damage due to hypercompression or compressive overtravel of the cushion can be prevented. It will be appreciated that as the bumper 32 is displaced axially toward the pier 28 in response to dynamic forces applied by the hull of a vessel, the cushions 36 are axially compressed. If the dynamic forces applied to the bumper are of sufficient magnitude and duration, the bumper may ultimately be displaced a distance sufficient to cause the inner surface 54 of the bumper 32 to abut the pads 52 of resilient material which compose the free ends 50 of the abutment members 46. By virtue of this abutment the bumper is positively prevented from further displacement toward the pier 28.

A plurality of stanchions 56, 58, 60, 62, 64, 66, 68, and 70 are rigidly and orthogonally cantilevered from the bumper 32 and the base plate 38 into the space therebetween. These stanchions are employed to connect lateral and axial restraining means to the bumper and pier.

The axial restraining means are illustrated in FIG. 3 in the form of link chain counters or countering means 72, 74, 76, and 78 which extend from the free ends of stanchions connected to the bumper to connect with the base plate 38. These counters are capable of acting only in tension and serve to positively limit the degree to which the cushions can be extended. This positive limitation serves to prevent damage which might be caused by hyperextension or overtravel of the cushions upon excessive displacement of the bumper 32 axially away from the pier. The chains in no way interfere with movement of the bumper toward the pier but rather only limit extension of the cushions and displacement of the bumper away from the pier.

The lateral restraining means are illustrated in the form of link chain counters 80, 82, 84, and 86 opposed ends of which alternately connect the free ends of stanchions connected to the pier and the free ends of stanchions connected to the bumper. The stanchions are of differing lengths and it will be noted that stanchions 56, 60, 64, and 68 are relatively short and extend correspondingly short distances into the space between the bumper and base plate. Stanchions 58, 62, 66, and 70 are relatively long and extend correspondingly long distances into the space between the bumper and base plate. Since the chains are connected to the free ends of the stanchions, the varying lengths thereof result in a coplanar, opposed arrangement of countering chains wherein the chains are disposed in pairs in two different parallel planes. Chains 80 and 82 are disposed in a single plane in relatively close parallel relation to the bumper 32 while chains 84 and 86 are disposed in a second plane in relatively close parallel relation to the base plate 38.

The lateral countering chains described in the preceding paragraph resist the components of dynamic forces exerted parallel to the plane of the bumper. The particular manner in which these parallel forces are resisted will be more fully described in connection with the discussion of FIG. 5. However, it should be noted at this point that the lateral restraining means or countering chains resist all lateral displacement of the bumper relative to the pier. In other words, not only is horizontal displacement of the bumper resisted but vertical displacement is resisted as well. As in the case of the axial countering chains, the resistance is developed through tensile forces only since a chain, of course, cannot sustain a compressive load.

The interrelation of the stanchions extending from the pier and the bumper can perhaps more clearly be seen by referring to FIG. 4 where an expanded perspective view of a bumper, base plate, and the associated stanchions can be seen. The cushioning and restraining elements have been removed for clarity of illustration. It can be seen that an even numbered plurality of stanchions are employed and that an equal number are disposed on the bumper and the base plate. Each stanchion cantilevered from the bumper is diagonally connected by means of a countering chain to a stanchion cantilevered from the base plate. It will be noted that stanchions of relatively short length, viz., stanchions 56, 60, 64, and 68, are connected to stanchions of longer length. More particularly, stanchion 56 is connected through chain 80 to stanchion 66. Stanchion 60 is connected through chain 84 to stanchion 70. Stanchion 64 is connected through chain 82 to stanchion 58; and stanchion 68 is connected through chain 86 to stanchion 62. This arrangement results in the chains being disposed in opposed, coplanar relation between the base plate and the bumper. As indicated in connection with the discussion of FIG. 3, chains 80 and 82 are coplanar and are located in closer proximity to the bumper 32 than are chains 84 and 86 which are also coplanar.

Referring now to FIG. 5, a sectional view taken along the lines 5—5 of FIG. 3 can be seen. A portion of the planar surface of the pier 28 can be seen with the base plate 38 attached. A plurality of cushions 36 which connect the bumper and base plate can be seen as they are preferably arranged adjacent the corners of the base plate within the perimeter of the bumper. A plurality of abutment members are shown as they are cantilevered from the base plate. The stanchions are shown arranged in opposed pairs on either side of each cushion adjacent the corners of the base plate. As indicated in connection with the discussion of FIG. 4, stanchions 58, 60, 66, and 68 are cantilevered from the base plate while stanchions 56, 62, 64, and 70 are cantilevered from the bumper. Lateral countering chains are alternately connected at opposed ends to the stanchions and extend between the bumper and the pier. Chain 80 extends between stanchions 56 and 66; chain 82 extends between stanchions 58 and 64; chain 84 extends between stanchions 60 and 70; and chain 86 extends between stanchions 62 and 68. As indicated in connection with the discussions of FIGS. 3 and 4 the stanchions are of different lengths and the chains, therefore, are arranged in opposed parallel, coplanar relation. In particular, chains 80 and 82 are coplanar and chains 84 and 86 are also coplanar. Axial countering chains illustrated in part in FIG. 3 and indicated in this figure generally by the numerals 72, 74, 76, and 78 and the associated arrows are hidden by the connecting fixtures which connect the chains to the stanchions. The particular manner in which these countering chains connect the stanchions of the bumper to the base plate will be more fully described in the discussion of FIGS. 6 and 7 to follow. However, it should be again noted that these countering chains prevent overtravel or hyperextension of the cushions due to excessive displacement of the bumper away from the pier.

Because the vertically inclined countering chains 80, 82, 84, and 86 are capable of acting only in tension, the chains alternately restrain the bumper. For instance, should a horizontal force such as that represented by the vector $H_l$ be exerted against the bumper parallel to the plane thereof, then stanchions 56 and 62 would tend to translate with the bumper. Chains 80 and 86 would then tighten and exert tensile forces restraining any displacement of the bumper relative to the base plate. Concurrently, chains 82 and 84 would tend to relax slightly. Likewise, if a force should be exerted against the bumper as represented by the vector $H_r$, then stanchions 70 and 64 would tend to translate with the bumper and chains 82 and 84 would tighten and exert tensile forces resisting displacement of the bumper. Concurrently, chains 80 and 86 would tend to relax slightly. Also, should a vertical force such as that represented by the vector $V_d$ be exerted against the bumper parallel to the plane thereof, stanchions 62 and 64 would tend to translate with the bumper. Chains 82 and 86 would then tighten and exert tensile forces restraining any displacement of the bumper relative to the base plate. Of course, if a diagonal force such as that represented by the vector D should be exerted against the bumper, parallel to the plane thereof, the countering chains will restrain the bumper from displacement since any diagonal vector can be resolved into horizontal and vertical components which can be resisted by a combination of the horizontal and vertical countering process described in the preceding.

Referring now to FIG. 6 a side view of a preferred embodiment of a docking fender according to the present invention can be seen in a condition free from the influence of any forces tending to compress the hydraulic cushion. A portion of the pier 28 can be seen with the base plate 38 in place. The base plate and pier are planar and vertically oriented as indicated in connection with the discussion of FIG. 3. The planar bumper 32 also can be seen to be connected in a spaced, parallel relation to the pier by the cushions 36.

The abutment members 46 are orthogonally and rigidly cantilevered from the base plate and are braced against buckling by suitable fillet members 48. As indicated in connection with the discussion of FIG. 3, the free ends of these abutment members are coplanar and terminate in pads 52 of resilient material. These coplanar, resilient free ends may be abutted by the interior surface 54 of the bumper 32 to avoid excessive compression of the cushions.

As illustrated in FIGS. 3, 4, and 5, a number of stanchions are cantilevered into the space between the bumper and the pier to carry the restraining chain counters which positively limit the displacement of the bumper laterally and axially away from the pier. The lateral countering chains appear in parallel, opposed, coplanar pairs which are parallel to the plane of the bumper and the pier. Due to the different lengths of the stanchions each pair of countering chains occupies a different plane.

The axial restraining chain counters extend horizontally from the free ends of each stanchion cantilevered from the bumper and are connected to the base plate opposite the stanchion. Chain 72 connects stanchion 56 to the base plate; chain 78 connects stanchion 70 to the base plate; chain 74 connects stanchion 72 to the base plate; and chain 76 connects stanchion 64 to the base plate. These countering chains limit the displacement of the bumper axially away from the pier and thus protect the cushions against hyperextension or overtravel axially away from the pier.

Referring finally to FIG. 7, a side view of a preferred embodiment of a docking fender can be seen in a condition in which the bumper 32 has been displaced toward the pier and the cushions 36 are fully compressed or telescoped. The coplanar, resilient free ends of the abutment members 46 are each in full contact with the inner surface 54 of the bumper 32. Thus, the bumper is positively stopped and cannot be further displaced toward the pier. The cushions are in this way protected against any further, possible damaging, compression.

The axial counters 72, 74, 76, and 78 are shown to be hanging loosely since the ends of stanchions 56, 72, 64, and 70 to which these counters are respectively connected have been displaced to positions of closer proximity to the base plate 38. Whereas in previous figures all four countering chains could not be individually seen, it is readily apparent from this figure that the bumper is connected to the base plate at all four corners adjacent each cushion.

The lateral counters in the fully compressed condition shown in FIG. 3 have been forced into skewed orientations due to the coplanar arrangement of the uncompressed configuration and since the stanchions are arranged in opposed pairs. In other words, displacement of the bumper toward the pier causes relative displacement of the members of each opposed pair of stanchions in opposite directions. Thus, since the chains of each opposed pair of stanchions are coplanar when the cushions are uncompressed, the chains move into a skewed configuration once the bumper is displaced toward the pier. It will, of course, be appreciated that the chains must be of greater length to assume the skewed configuration than if the chains were to remain parallel to the bumper and the base plate. Therefore, although in previous illustrations the chains have been shown to be stretched taut, it can now be understood that, in fact, the chains are somewhat loose so that displacement of the bumper toward the pier is restrained only by the energy dissipating action of the cushions. It should be noted that the chains are only loose enough to allow them to assume the skewed configuration illustrated in FIG. 7. It should be emphasized that the amount of slack required is not sufficient to cause any undue sagging in the chains.

SUMMARY OF MAJOR ADVANTAGES OF THE INVENTION

It can be readily appreciated at this point by those skilled in the art that a number of significant advantages are provided by the novel docking fender disclosed in the preceding. For instance, the docking fender provides a highly efficient hydraulic cushioning arrangement wherein the cushions are axially compressed upon displacement of the entire bumper as a unit toward the pier. The cushions are orthogonally oriented relative to the bumper and pier and therefore are compressed axially by an amount equal to the extent of the displacement of the bumper toward the pier. In other words, the cushions are axially compressed by an amount equal to the distance the bumper is displaced toward the pier. Thus, the cushions can undergo greater compression and can resist dynamic forces over a longer time and distance than if the cushions were splayed.

The lateral counters restrain and laterally stabilize the bumper relative to the pier. Therefore while the bumper is entirely free to be displaced toward the pier, the potential for damage to the cushions or for diminished cushioning capacity is reduced. Furthermore, the bumper is vertically supported without the need for any secondary structure and without imposing any unnecessary suspending forces upon the cushion.

The axial restraining counters positively limit the extent to which the cushions can be axially extended. In this way the cushions are protected from damage which may be caused by hyperextension or axial overtravel of the hydraulic cushions. Similarly, the abutting members positively limit the degree of compression of the cushions and thus minimize the possibility that the cushions may be damaged by hypercompression or compressive overtravel due to excessive displacement of the bumper towards the pier.

It is also important to recognize that all of the cushioning and restraining elements, including the hydraulic cushions, the axial and lateral counters, and the abutment members, are arranged and contained within the perimeter of the bumper. Thus, the space required by the docking fender is minimized and the cushioning and restraining elements are protected from damage.

In describing the invention, reference has been made to a preferred embodiment. However, those skilled in the art and familiar with the disclosure of the invention may recognize certain additions, deletions, substitutions or other modifications which would fall within the perview of the invention as defined in the claims.

What is claimed is:

1. A marine docking fender, for dissipating the energy of dynamic forces exerted by a floating vessel against a pier having at least one generally vertical side facing a body of water, said docking fender comprising:
    a. bumper means for receiving dynamic forces from the hull of a floating vessel, said bumper means being connected in spaced relation to said side of said pier facing said body of water;
    b. at least one compressible self-restoring cushioning means, extending orthogonally between and connecting said bumper means and said pier, for dissipating the dynamic forces; and c. diagonal, vertically inclined countering means for exerting tensile forces upon said bumper means to rigidly restrain said bumper means against lateral displacement relative to said pier in response to the lateral components of the dynamic forces.

2. A marine docking fender as defined in claim 1 wherein said vertically inclined countering means each comprise:

opposed, parallel, alternately acting link chains.

3. A marine docking fender as defined in claim 2 wherein:

said vertically inclined countering means comprise an even numbered plurality of stanchions each rigidly extending in a cantilevered posture from said pier and said bumper means into the space therebetween, an equal number of said stanchions being connected to said pier and said bumper means, and each of said chains are alternately connected at opposed ends thereof to the free end of a stanchion extending from said pier and the free end of a stanchion extending from said bumper means, said chains of each countering means being thereby disposed in a generally vertical plane parallel to said bumper means.

4. A marine docking fender as defined in claim 3 wherein:

said bumper means and said side of said pier are generally rectangular, vertical, planar members; and said stanchions are orthogonally cantilevered in opposed pairs from said side of said pier and said bumper means adjacent corners thereof.

5. A marine docking fender as defined in claim 2 and further comprising:

a plurality of elongated abutting means rigidly cantilevered from said side of said pier for contacting said bumper means to prevent overtravel of said cushioning means in compression, the free ends of said abutting means being coplanar and composed of a resilient material.

6. A marine docking fender as defined in claim 1 and further comprising:

axial countering means for exerting tensile forces upon said bumper means to restrain said bumper means against displacement axially away from said pier beyond a prescribed distance wherein said cushioning means are fully extended.

7. A marine docking fender as defined in claim 2 and further comprising:

axial countering means for exerting tensile forces upon said bumper means to restrain said bumper means against displacement axially away from said pier beyond a prescribed distance wherein said cushioning means are fully extended.

8. A marine docking fender as defined in claim 7 wherein said axial countering means comprises:

a plurality of generally horizontal link chains extending between said bumper means and said pier with at least one of said chains being disposed adjacent each of said cushioning means.

9. A marine docking fender as defined in claim 6 wherein:

said lateral and axial countering means and said cushioning means are disposed between said bumper means and said pier entirely within the perimeter of said bumper means.

10. A docking fender for dissipating the energy of dynamic forces exerted by a floating vessel against a pier having at least one generally vertical essentially planar side facing a body of water, said docking fender comprising:

a generally vertically oriented, essentially planar, rectangular bumper means for receiving dynamic forces from the hull of a floating vessel, said bumper means being connected in substantially parallel spaced relation to said planar side of said pier;

at least one telescoping, self-restoring, hydraulic cushioning means universally connected to and extending between said bumper means and said pier for dissipating the dynamic forces, said cushioning means being oriented in a generally orthogonal posture relative to said planar side of said pier entirely within the perimeter of said bumper means;

vertically inclined countering means for exerting tensile forces upon said bumper means to rigidly restrain said bumper means against lateral displacement in response to dynamic forces having lateral components, said countering means diagonally connecting said bumper and said pier at points adjacent the corners and within the perimeter of said bumper means; and axial countering means extending between and connecting said bumper means and said pier for exerting tensile forces upon said bumper means to restrain said bumper means against displacement axially away from said pier beyond a prescribed distance wherein said cushioning means are fully extended, at least one of said countering means being disposed adjacent each of said cushioning means within the perimeter of said bumper means.

11. A marine docking fender as defined in claim 10 wherein:

said vertically inclined countering means comprise vertically inclined, opposed, parallel, alternately acting link chains; and said axial countering means comprise horizontal, opposed, parallel link chains.

12. A marine docking fender as defined in claim 11 wherein:

said countering means comprises an even numbered plurality of stanchions rigidly and orthogonally cantilevered in opposed pairs from said pier and said bumper means into the space therebetween adjacent the corners and within the perimeter of said bumper means, an equal number of said stanchions being connected to said pier and said bumper means;

each of said vertically inclined chains are alternately connected at opposed ends thereof to the free end of a stanchion extending from said pier and the free end of a stanchion extending from said bumper means, said chains of each vertically inclined countering means being thereby disposed in a generally vertical plane parallel to said bumper means; and each of said horizontal chains are alternately connected at opposed ends thereof to the free end of a stanchion extending from said bumper means and said planar side of said pier.

* * * * *